(12) United States Patent
Purpura

(10) Patent No.: US 8,520,503 B2
(45) Date of Patent: Aug. 27, 2013

(54) SUPPORTING APPLICATION EFFECTIVENESS IN A NETWORK ENVIRONMENT

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 12/881,697

(22) Filed: Sep. 14, 2010

(65) Prior Publication Data
US 2011/0004686 A1 Jan. 6, 2011

Related U.S. Application Data

(63) Continuation of application No. 11/702,747, filed on Feb. 6, 2007, now Pat. No. 7,817,536, which is a continuation-in-part of application No. 11/367,240, filed on Mar. 3, 2006, now Pat. No. 7,929,542.

(51) Int. Cl.
*G06F 15/173* (2006.01)

(52) U.S. Cl.
USPC .................................................. 370/216

(58) Field of Classification Search
USPC .................. 709/226, 205, 222; 370/252, 216
See application file for complete search history.

(56) References Cited

U.S. PATENT DOCUMENTS

| | | | |
|---|---|---|---|
| 6,434,628 B1 | 8/2002 | Bowman-Amuah | |
| 6,459,683 B2 | 10/2002 | Busuioc et al. | |
| 6,640,248 B1 | 10/2003 | Jorgensen | |
| 6,754,230 B2 | 6/2004 | Purpura et al. | |
| 6,801,764 B2 | 10/2004 | Purpura | |
| 6,810,422 B1 | 10/2004 | Cross | |
| 6,977,898 B1 * | 12/2005 | Miriyala | 370/236 |
| 6,980,546 B2 | 12/2005 | Purpura et al. | |
| 7,069,014 B1 | 6/2006 | Thenthiruperai et al. | |
| 7,154,859 B2 | 12/2006 | Purpura | |
| 7,289,453 B2 | 10/2007 | Riedel et al. | |
| 7,307,954 B1 * | 12/2007 | Strandberg et al. | 370/235 |
| 7,817,536 B2 | 10/2010 | Purpura | |
| 2002/0053020 A1 | 5/2002 | Teijido et al. | |
| 2002/0073062 A1 | 6/2002 | Cerami et al. | |
| 2004/0174822 A1 * | 9/2004 | Bui | 370/252 |
| 2005/0064820 A1 | 3/2005 | Park et al. | |
| 2005/0094574 A1 | 5/2005 | Han et al. | |
| 2005/0100022 A1 | 5/2005 | Ramprashad | |

(Continued)

OTHER PUBLICATIONS

Forsythe et al, "Evaluation of Net-Centric Command and Control via a Multi-resolution Modeling Evaluation Framework", 10th International Command and Control Research and Technology Symposium, The Future of C2, Jun. 13-15, 2005, McLean, VA.*

(Continued)

*Primary Examiner* — Thai Nguyen
(74) *Attorney, Agent, or Firm* — Harness, Dickey & Pierce, P.L.C.

(57) ABSTRACT

A system for performing a mission/control application by means of an integrated application in a network-centric environment using one or more capabilities attributed to the application, with each capability being assigned one or more priorities for the application. The system may have at least one node configured to identify a change in the one or more capabilities, and to negotiate in the network-centric environment to resolve the change. The node may further be configured to negotiate until the application is provided with one or more resources resolving the change in accordance with one or more applicable priorities.

12 Claims, 4 Drawing Sheets

(56) References Cited

U.S. PATENT DOCUMENTS

| | | |
|---|---|---|
| 2005/0143013 A1 | 6/2005 | Jha |
| 2006/0229080 A1* | 10/2006 | Khan et al. .................. 455/450 |
| 2007/0071028 A1 | 3/2007 | Dorris et al. |
| 2007/0206506 A1 | 9/2007 | Purpura |
| 2007/0206511 A1 | 9/2007 | Purpura |
| 2007/0274337 A1 | 11/2007 | Purpura |
| 2009/0215411 A1 | 8/2009 | Tucker et al. |
| 2010/0095017 A1 | 4/2010 | Ghetie et al. |

OTHER PUBLICATIONS

Procedure for Interoperability and Supportability of Information Technology and National Security Systems, Department of Defense Instruction, No. 4630.8, Jun. 30, 2004.

* cited by examiner

| Infrastructure NCO Capability | Performance Parameter | | | | Resource Parameter | | | | Application Priority | | | | Capability Relationship | | | | |
|---|---|---|---|---|---|---|---|---|---|---|---|---|---|---|---|---|---|
| | PP1 | PP2 | PP3 | PP4 | R1 | R2 | R3 | R4 | P1 | P2 | P3 | P4 | IO | IA | DM | KM | CCI |
| Interoperability | F1 X% F1<br>F2 Y% F2 | | | | | | | | | | | | | | | | |
| Information Assurance | 1 100% | | | | | | | | | | | 1 | | | | | |
| Data Management | | | | | | | | | | | | | 1 | 2 | | | |
| Knowledge Management | | | | | | | | | | | | | 1 | 2 | 3 | 4 | |
| Collaboration in Communities of Interest | | | | | | | | | | | | | 1 | 2 | 3 | 4 | 5 |

Fig. 1

SUPPORTING APPLICATION EFFECTIVENESS IN A NETWORK ENVIRONMENT

CROSS-REFERENCE TO RELATED APPLICATIONS

This application is a continuation of U.S. patent application Ser. No. 11/702,747, filed Feb. 6, 2007 (now U.S. Pat. No. 7,817,536), which is a continuation-in-part of U.S. patent application Ser. No. 11/367,240, filed on Mar. 3, 2006 (now U.S. Pat. No. 7,929,542), the disclosure of which is incorporated herein by reference in its entirety. This application is also related to U.S. patent application Ser. No. 11/702,746, filed Feb. 6, 2007 (now U.S. Pat. No. 7,969,879) and U.S. patent application Ser. No. 11/702,745, filed Feb. 6, 2007 (now U.S. Pat. No. 7,894,357), the disclosures of which are incorporated herein by reference in their entirety.

FIELD

The present disclosure relates generally to communication networks and data exchange networks and more particularly (but not exclusively) to methods and systems for supporting effectiveness of missions being performed in network-centric operations and/or other network environments, including but not limited to system-of-systems environments.

BACKGROUND

The statements in this section merely provide background information related to the present disclosure and may not constitute prior art.

As communication and electronic data exchange network environments become increasingly complex, chances for network failures also increase. Factors such as weather, equipment breakdown and mobility of network nodes are common causes of network capability degradation. In military network-centric operations (NCO), it is highly desirable for communications and/or weapon systems to perform effectively under difficult conditions, and particularly under battle conditions.

SUMMARY

The present disclosure, in one implementation, relates to a system for performing an application in a network-centric environment using one or more capabilities attributed to the application, with each capability being assigned one or more priorities for the application. The system may comprise at least one node configured to identify a change in the one or more capabilities, and to negotiate in the network-centric environment to resolve the change. The node may further be configured to negotiate until the application is provided with one or more resources resolving the change in accordance with one or more applicable priorities.

In another implementation the present disclosure relates to a system for performing a given application in a network-centric environment. The system may comprise a plurality of nodes having a plurality of applications. The nodes and applications may be configured with reference to a framework, with the framework predefining an ordered relationship hierarchy of a plurality of network capabilities providable by applications and nodes in the environment. The hierarchy may have interoperability as a base capability upon which all of the other predefined capabilities depend. At least one node may be configured to identify a change in the one or more predefined capabilities attributed to the given application. The at least one node may also be configured to negotiate in the network-centric environment to resolve the change. And finally the at least one node may further be configured to negotiate until the given application is provided with one or more resources resolving the change in accordance with one or more applicable priorities of the given application.

In another implementation the present disclosure relates to a system that may comprising a network having a plurality of nodes including a plurality of applications. The network may be configured such that a given node of the network operates to detect a change in one or more resources supporting a given application on the given node. The plurality of nodes and applications may also be configured in the network with reference to a framework predefining an ordered relationship hierarchy of a plurality of network capabilities providable by the applications and nodes, with the hierarchy having interoperability as a base capability upon which all of the other predefined capabilities depend, and where each said application is attributed with one or more of the predefined capabilities. The given node may operate to test, in a first order predetermined by the hierarchy, the predefined capabilities attributed to the given application to identify an affected capability in which a change caused the detected change in the one or more resources. The given node may also heal the affected capability. The healing may be performed by the given node negotiating, in a second order determined by the hierarchy, with other nodes of the network for one or more resources to resolve the detected change. The given node may also verify, as to the attributed capabilities of the given application in the second order determined by the hierarchy, that the one or more resolving resources support the attributed capabilities, if any, of the given application that support the affected capability. The given node may also make the one or more resolving resources available to the given application.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a diagram of a framework for capability effectiveness assurance in accordance with one implementation of the present disclosure;

DETAILED DESCRIPTION

Figure 2:
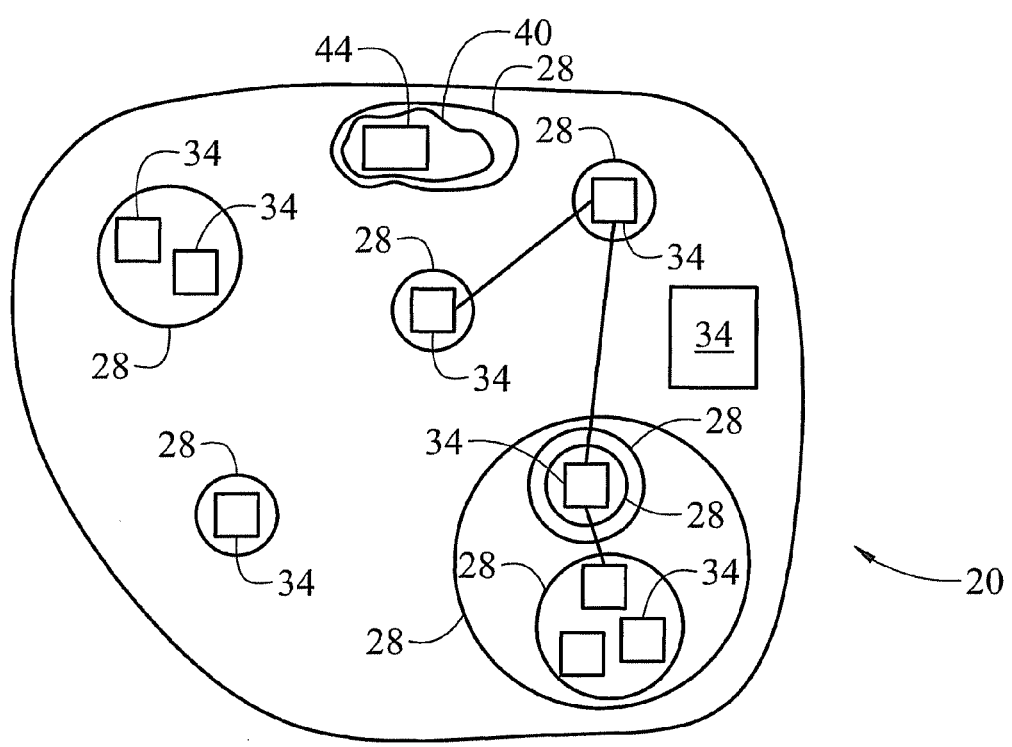
FIG. 2 is a diagram of a network-centric environment in accordance with one implementation of the present disclosure.

The following description is merely exemplary in nature and is not intended to limit the present disclosure, application, or uses.

Although various implementations of the present disclosure may be described with reference to network-centric operations (NCO) and military applications, the disclosure is not so limited. The disclosure may be implemented relative to many different networks and network-centric environments, including but not limited to various enterprise systems and non-military applications.

It is highly desirable for NCO devices, systems and equipment to be and remain interoperable, e.g., during battle conditions. However, although such systems might be introduced into battle conditions with specific NCO capability, as battle progresses, the impact of battle typically can cause degradation of data streams and communications links. Thus the chance that the planned NCO capability effectiveness would be maintained can quickly diminish. If a key link fails in a stovepipe system, a total loss of planned-for capabilities can result.

It is contemplated that enterprises will be called on to run applications in a NCO environment using network resources from a plurality of networks, e.g., to support a specific mission. Such applications might provide network capabilities as well as require network capabilities that might not be adequate and/or available, e.g., in the current network of a mission commander. Furthermore, resources, nodes and applications may be constantly changing. Devices may fail, nodes may enter and leave a network, and applications may run in an ad-hoc manner, competing for resources.

Although it is highly desirable to ensure that network capabilities are available to support a mission, enterprises might not provide information in the same manner with respect to what capabilities are needed or provided. Furthermore, when degradation occurs in a NCO environment, it frequently is characterized in terms of a component failure rather than a degradation of capability. It can be difficult to assess a total impact across all applications in a network as to capabilities to support a mission.

In U.S. patent application Ser. No. 11/367,240 filed on Mar. 3, 2006, the disclosure of which is incorporated herein by reference in its entirety, control modules are described which may arbitrate application, device and network capability requirements. In such manner, conflict may be resolved and effectiveness may be optimized with respect to, e.g., processing, storage, and communication links. Needs of NCO capabilities may be balanced to maximize overall probability of effectiveness of intended NCO capabilities.

In various implementations of the present disclosure, different enterprises in a NCO environment may provide diverse resources, nodes, and applications to the environment to achieve a specific mission. Resources may include devices such as servers, processors and security devices as well as substantially any other asset or application required to enable a NCO capability needed to accomplish a task/mission. Nodes on a network may be, e.g., sensors, effectors, or command and control points which may include aircraft, ships, ground force radios, satellites, and/or other entities that part of the network.

In various implementations and as further described below, self-healing capability effectiveness assurance (CEA) may be provided as to each of a plurality of capabilities shared among enterprises. Support and interaction may be provided from application to device and then to the end-to-end resource and performance management of the environment utilized. In various implementations of the disclosure of U.S. patent application Ser. No. 11/367,240, capability effectiveness assurance (CEA) may be provided at an application level. In some implementations of the present disclosure, CEA self-healing is provided that can cross enterprise boundaries. Additionally, specific core CEA capabilities may be off-loaded to separate enterprises, e.g., to maintain CEA across an integrated battle space.

Various implementations of the disclosure may provide self-healing of systems operating between multiple enterprises as well as the other systems operating within such enterprises. Such self-healing can be accomplished through management on a capability-by-capability basis while possible conflict and performance impacts to the overall environment are taken into account. Such self-healing can take place in real time under ad-hoc conditions, so that, e.g., an expected probability of success of a mission may be maintained.

In various implementations, a common framework is provided for healing an NCO environment to assure capability effectiveness for a mission. A framework for NCO capability effectiveness assurance (CEA) includes a plurality of hierarchical capability levels (each level of which may also be referred to in this disclosure and in the claims as a "capability"): (1) interoperability, (2) information assurance, (3) data management, (4) knowledge management, and (5) collaboration in communities of interest. The capability levels (1) through (5) operate in a distinct hierarchical and dependent relationship. More specifically, a higher level requires the availability of capabilities provided by lower levels (if any) utilized. For example, information assurance (level 2) requires that interoperability (level 1) be operational first, so that an actual data link may be available via which information assurance activities may communicate. In the same or similar manner, capability level 3 requires availability of levels 2 and 1, and so on.

These capability levels, which are further described below, may be imposed on nodes, resources, and applications such that each node, resource, and/or application can be described in terms of the capabilities that they provide, and the capabilities that they require. In such manner, there can be a common frame of reference to plan an extent of capabilities needed from diverse enterprises, and dynamically assess cumulative capabilities in the NCO environment, e.g., during the course of a mission.

A framework for capability effectiveness assurance is indicated generally in FIG. 1 by reference number 4. Each capability level 6 may be evaluated as to performance parameter(s) 8, resource parameter(s) 10, application priority(s) 12, and capability relationship(s) 14. Performance parameters 8 are customer-driven operational characteristics that may be, e.g., performance-focused or requirements-focused, that are measurable and that relate to a particular capability. In some implementations, a performance parameter may be derived from Key Performance Parameters (KPPs), e.g., Net-Ready Key Performance Parameters (NR-KPPs), as defined by the United States Department of Defense. Performance parameters utilized may be those that are anticipated to be key to evaluating the usability and availability of candidate capabilities during mission planning and during healing as further described below. For example, a performance parameter 8 may specify a type of support for integrated architecture products, information assurance accreditation, or compliance to a key interface profile. Performance parameters 8 are specified based, e.g., on operational needs of a mission and are used to determine whether a NCO environment in which the mission is to be performed meets capability needs of the mission.

Resource parameters 10 are basic resource criteria that identify real world constraints and needs of the associated capability. A resource parameter 10 may specify one of a wide variety of resources, including but not limited to central processing unit (CPU), storage, bandwidth, and input/output (I/O) ports. It should be noted that resources can also include physical units. Thus a resource parameter 10 may specify, e.g., whether a network encryption service (NES) encryption device is available to support information assurance requirements. Further, each capability 6 may require some measure of CPU/storage from available CPU/storage. After the required CPU/storage is analyzed for all capabilities 6, the remaining CPU/storage can be set aside for users. The resource parameters 10 may be a target of optimization across a capability 6. If capability resource parameters 10 can be minimized, more resource can be freed up for use.

Application priority 12 provides a means to resolve contention between competing users for a finite amount of network resources at each particular capability level 6. Information 14 regarding the relationship of one capability 6 to another capability 6 is specified. This hierarchical dependence, as previously described, is used to specify a particular order for analyzing capabilities to find solutions or optimize capability resources. The use of a particular analysis order can ensure that solutions at one capability level still support higher capability levels that depend on the lower capability level.

In various implementations, the disclosure is directed to systems for and methods of performing an application in a network-centric environment using one or more network capabilities. An exemplary network-centric environment is indicated generally in FIG. 2 by reference number 20 and shall hereinafter be referred to as a network. The network 20 may include a plurality of nodes 28 each capable of communicating with and/or being interrogated by one or more nodes 28 of the network. One or more nodes 28 may be ad hoc and/or mobile. At least one node 28 may include a system 40 for performing an application using one or more network capabilities in accordance with an implementation of the disclosure. The system 40 may include at least one computer 44 having a processor, memory and one or more input/output devices configured to communicate with at least one other node 28. It should be noted that although the system 40 is shown in FIG. 2 as a single entity, the system 40 is typically distributed throughout the network 20 and is likely to be implemented at least in part using a plurality of ad-hoc nodes 28. The nodes 28 support one or more applications 34.

Unless otherwise indicated, the term "node" may include a network, a sub-network, a sub-node and/or an elemental node of a network, and the term "network" may include a sub-network, a system-of-systems, an enterprise (i.e., a network of networks) and/or a network-centric operations environment. It should be noted that various implementations are contemplated in connection with many types of multi-layered networks and NCO environments, and so the terms "node", "network", "system" and the like may be used interchangeably. An entity that connects to a level above itself may be referred to as a "node", e.g., by a higher-level network or node to which the connection is made. In some implementations, one or more applications 34 may be included in and performed as a mission and may be subject to human intervention, e.g., by a commander.

In some implementations, a framework based on a set of network capabilities is predefined for and supported by the network 20, e.g., as further described below. In various implementations of the disclosure, a plurality of, and in some cases all or substantially all, nodes 28 and applications 34 are implemented with reference to the same framework of predefined network capabilities. One or more of the predefined network capabilities may be attributed to a given application 34 and/or node 28 of the network 20. For example, a node 28 and/or application 34 may utilize, and thus be attributed with, one or more of the following capabilities:

1) Interoperability: capability to connect, communicate, exchange, and understand information and operate together to achieve a common goal.

2) Information assurance: Assurance that a system can be relied on to provide data that is trustworthy and secure.

3) Data management: Capability to store, share, organize, retrieve and distribute understandable information and its importance and implications of information to achieve a goal.

4) Knowledge management: Ability to locate and obtain information with or without prior knowledge of its location or ownership.

5) Collaboration in communities of interest: Ability for users, across systems and systems of systems, to collaborate, e.g., in two types of groups of common interest: birds of a feather groups (subject matter experts) and groups focused on completing a specific task who locate and obtain information with or without prior knowledge of its location or ownership.

In various implementations of the present disclosure, capability effectiveness assurance (CEA) may be provided with reference to the foregoing capability framework. CEA is a capability to acquire information and services from a plurality of sources across a network, system and/or system-of-systems, e.g., to enable mission completion in a mutually optimized manner across the network, system and/or system-of-systems, and to provide for ad-hoc self-healing across the network, system and/or system-of-systems. Reference is made to U.S. patent application Ser. No. 11/367,240, entitled "Supporting Effectiveness of Applications in a Network Environment", the disclosure of which is incorporated herein by reference in its entirety. In patent application Ser. No. 11/367,240, methods and systems are described whereby network applications may negotiate with one another to obtain network resources.

Performing an application 34 entails the use of resources, e.g., processing, storage, bandwidth and/or input/output (I/O) ports in the network 20. Each network level of the network 20 broadcasts resource availability and uses a resource registry to monitor resource allocation. In an ad-hoc network environment, the allocation and use of resources can be subject to rapid change. Competition for network resources among nodes with different levels of resource priorities could result in unexpected shortages of one or more network resource. In various implementations of the disclosure, in the event, e.g., of a reduction in one or more network capabilities of a given application 34, the reduction may be automatically addressed in the network environment to allow the application 34 to be implemented. Nodes may negotiate in the network-centric environment, e.g., with next-level environment master registration modules, to resolve the capability change, e.g., until the application is provided with one or more network resources resolving the capability change. Negotiation may include the changing (e.g., reduction) of one or more priorities associated with the given application 34, for example, if desired by a mission approval authority that originally assigned the associated priorities. The application 34 may be terminated, e.g., by a mission authority or an environment register module (if so enabled), if critical resources are not available to resolve the change or if resources are available but do not satisfy a priority assigned to the application.

It should be noted generally that terms such as "application", "capability" and "resource" are not limited to the examples described in this disclosure. For example, an application could be a mission or part of a mission, one or more capabilities could be defined in addition to or in place of one or more of the foregoing capabilities, and/or a resource could include such items as trucks, equipment, gasoline, etc.

Each application 34 is configured to implement one or more of the foregoing five enumerated capabilities subject to one or more performance parameters predefined for the application capability(s). In various implementations and as further described below, performance parameters may include Net-Ready Key Performance Parameters (NR-KPPs) provided by the U.S. Department of Defense (DoD). Additionally, each application 34 and/or node 28 is configured to negotiate, as to each of its capability(s), with the nodes 28 for a network resource such as processing, storage, bandwidth and/or input/output (I/O) ports to support the application capability(s) in accordance with one or more performance parameters.

For an application 34, each framework capability attributed to the application may be conditioned by one or more performance parameters specific to the application and to the capability. A performance parameter conditions activity of an application or standalone node by, e.g., defining a critical operational capability of the application or node. A performance parameter thus may be expressed, e.g., in terms such as "bandwidth supported" or "sensor detection range".

For example, and referring to FIG. 1, where an application 34 is for an ability to send voice-over-Internet Protocol (VoIP), two of the foregoing network capabilities may be attributed to the application: (1) interoperability and (2) information assurance. A first interoperability performance parameter PP1 may be used to specify a connection type that the application/host device can support. There could be, for example, two connection options for the VoIP application 34, each of which may be referred to as a "functionality level": F1, e.g., a satellite phone connection, and/or F2, e.g., an FM line-of-sight transceiver connection. In the present example, functionality level F1 has a probability of effectiveness of x % and functionality level F2 has a probability of effectiveness of y %. A probability of effectiveness may be defined as a probability that a capability (in this case, interoperability) can achieve a desired result. A second interoperability performance parameter PP2 may be used to specify bandwidth(s) supported using the foregoing two functionality levels.

For the information assurance capability for the present exemplary VoIP application 34, there may be one performance parameter: whether or not a user has the correct password to allow access to other VoIP application(s). Thus the performance parameter PP1 specifies "1" and a probability of effectiveness of 100%, indicating that where the user has the correct password, there is projected to be a 100% probability of effectiveness with respect to information assurance for the VoIP application 34. The exemplary VoIP application 34 would not utilize the higher-order capabilities, i.e., data management, knowledge management, and collaboration of communities of interest. It should be noted that a wide variety of performance parameters could be defined.

In various implementations of the disclosure, each application 34 and/or node 28 has its own control matrix in which various values may be tracked. An exemplary control matrix is indicated generally in FIG. 3 by reference number 100. In some implementations, a control matrix 100 for an application 34 may be used differently from a control matrix 100 for a node 28.

In the present exemplary implementation, Net-Ready Key Performance Parameters (NR-KPPs) provided by the U.S. Department of Defense (DoD) are used as performance parameters. As known in the art, KPPs are measurable, testable, or calculable characteristics and/or performance metrics required for timely, accurate and complete exchange and use of information. In the present exemplary implementation, up to four KPPs 108 may be provided for each capability 104.

Figure 3:
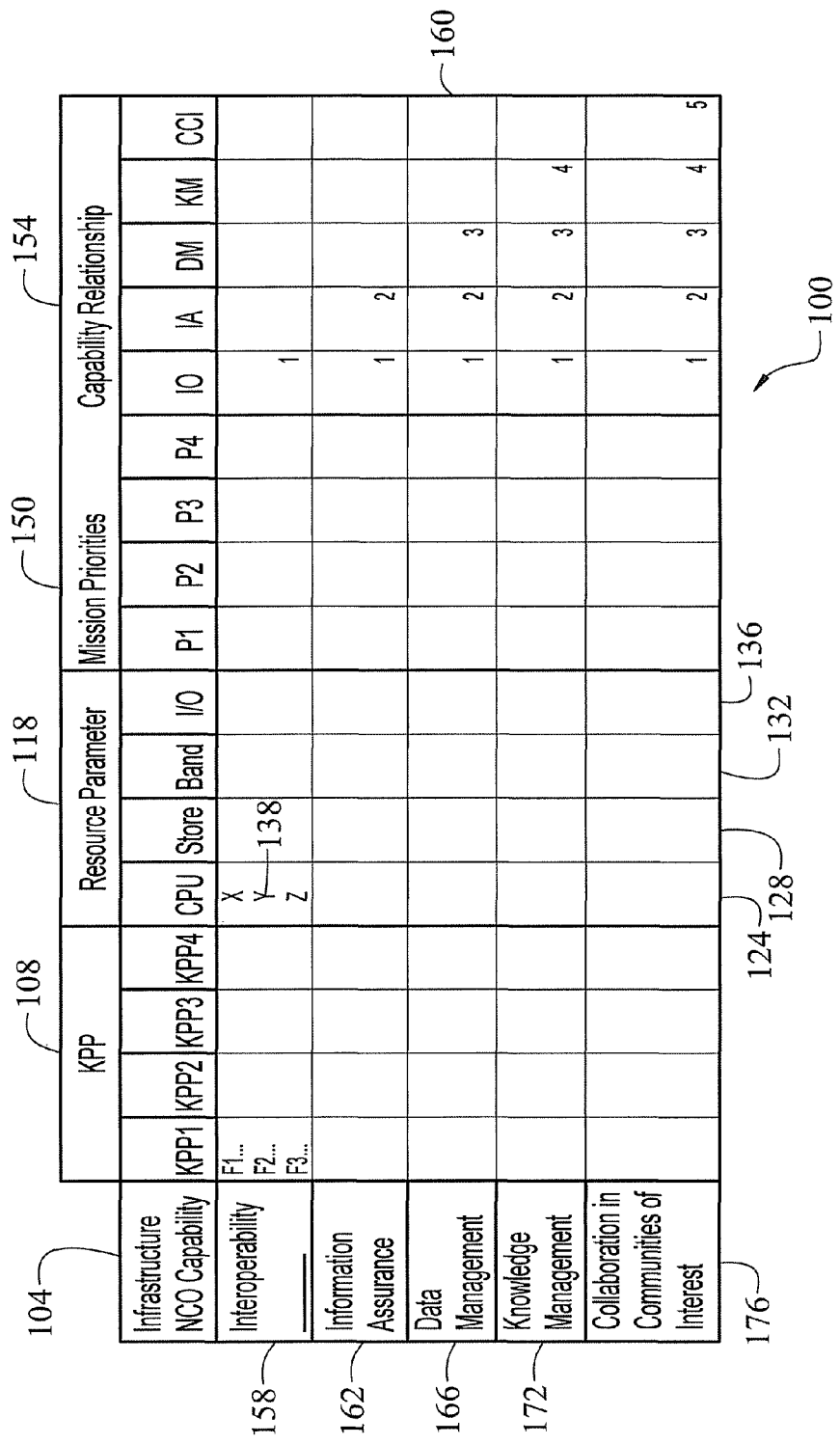
FIG. 3 is a control matrix in accordance with one implementation of the present disclosure.

The KPPs may be, e.g., Key Interface Profiles (KIPs). It should be understood, however, that other or additional types of performance parameters could be used in various implementations. Additionally or alternatively, more than or less than four performance parameters could be used in various implementations, although using more than four performance parameters might require, e.g., additional processing time. As shown in FIG. 3, one KPP 108 for interoperability includes three functionality levels F1, F2 and F3. Although other KPPs 108 for interoperability and other capabilities 104 may also specify functionality levels, only interoperability KPP1 is shown for clarity.

For each capability 104, resource parameters 118 indicate resource usage by the application and/or node and may be updated substantially continuously as conditions change. For the present exemplary matrix 100, resource parameters 118 are included for processing 124, storage 128, bandwidth 132, and input/output (I/O) ports 136. For a given capability 104, the resource parameters 118 for each resource may indicate one or more values 138 of each identified resource of the network 20 required to operate every sub-capability of the given capability 104 utilized by the application 34 and/or node 28. Accordingly, values included in the resource parameters 118 may represent, e.g., physical units such as gigabytes of storage or megabits of bandwidth.

As shown in FIG. 3, only one resource parameter 118, i.e., for interoperability processing, is indicated for clarity. Three processing values 138 support the interoperability KPP1 functionality levels F1, F2 and F3 respectively. Other types of values also are contemplated and may vary widely in accordance with a wide variety of types of resources that may be specified in various implementations. In the present exemplary implementation, up to four resources 118 per capability 104 per application 34 may be specified. Other numbers of resources are possible, although specifying more than four resources may, e.g., increase processing time in the network.

It should be noted generally that a capability is provided by the sum of its sub-capabilities. Thus "sub-capability" may be used to refer, for example, to interoperability utilized by one application 34 of a node 28 having two applications 34, while "capability" may refer to total interoperability utilized by the node, i.e., interoperability utilized by both applications. Similarly, interoperability utilized by one (a "first") node 28 may be a sub-capability of a second node of which the first node is a sub-node. The term "capability" may be used in this disclosure and in the claims to refer to a sub-capability and/or a capability.

Each capability 104 may be assigned one or more priorities 150. A priority 150 is applicable to, and in the present implementation, corresponds to, a resource. Thus, referring to FIG. 3, priority P1 is applicable to CPU, and priority P2 is applicable to storage. A relationship hierarchy 154 is defined among the NCO capabilities 104, to specify an order in which the capabilities 104 are evaluated, e.g., in negotiation for resources as further described below. It can be appreciated by those knowledgeable in the art that the order of the hierarchy 154 reflects relative dependencies intrinsic to the capabilities 104. For example, interoperability 158 is first in the hierarchy 154 since interoperability is the ultimate basis from which all of the higher-level four capabilities depend. It can be seen that information assurance 162 depends on interoperability 158, data management 166 depends on information assurance 162, knowledge management 172 depends on data management 166, and collaboration in communities of interest 176 depends on knowledge management 172. In other words, all higher-order NCO capabilities require at least interoperability 158, and possibly additional intermediary capabilities 104, to provide their capabilities. Accordingly, each row 160 in the capability relationship hierarchy 154 indicates an iteration sequence for self-healing, further described below, for the corresponding capability 104.

A node 28 and/or application 34 may monitor an application control matrix 100 in order to detect changes, if any, in resources 118 supporting one or more application capabilities 104. If no change is detected, the application 34 may continue to execute. If a change in a capability resource 118, e.g., a loss of data, a line drop, etc., is detected, the node 28 may first verify conditions required to maintain a required probability of effectiveness for the affected application 34. Various implementations of probabilities of effectiveness are described in U.S. patent application Ser. No. 11/367,240, entitled "Supporting Effectiveness of Applications in a Network Environment", the disclosure of which is incorporated herein by reference in its entirety.

If the change is determined not to unacceptably reduce a required probability of effectiveness, the affected application 34 may continue to execute, even though one of its resources 118 might be diminished. In other implementations, it may be assumed that any detected change would be unacceptable. If, e.g., a probability of effectiveness has dropped to an unacceptable level, the node 28 and/or application 34 may proceed to identify the change(s). Identification begins at the lowest capability (e.g., interoperability 158) and proceeds through all additional capabilities 104 (if any) of the application 34 to determine a cause for the capability change.

An example shall now be described relative to an application 34 that uses a streaming video feed to supply data. The application utilizes two capabilities: interoperability and information assurance. Where a node 28 upon which the application is running has determined, e.g., from resource parameters 118 of a matrix 100 for the application, that a capability of the application 34 is no longer functioning, the node 28 begins at the lowest capability (interoperability 158) to determine whether, e.g., a raw feed for the application 34 is working. If the raw feed is not working, the node 28 has found the source of the change. If the feed is working, the node 28 proceeds to check information assurance 162, e.g., to check whether the application has access to a needed level of encryption. If a needed access is not available, the node 28 identifies the lack of availability as the source of the capability change. When the change has been identified, the node 28 commences a self-healing process in the following manner.

Generally, the application host node 28 may negotiate in the network-centric environment to resolve the change. Reference is made to U.S. patent application Ser. No. 11/367,240, entitled "Supporting Effectiveness of Applications in a Network Environment", the disclosure of which is incorporated herein by reference in its entirety. In patent application Ser. No. 11/367,240, methods and systems are described whereby network applications may negotiate with one another to obtain network resources. In various implementations of the present disclosure, negotiating may be performed among nodes 28 for various applications 34 of the network 20 until, e.g., based on a probability of effectiveness, a given application 34 is provided with one or more network resources resolving, i.e., "healing", a change detected in the given application's capabilities. In various implementations of the present disclosure, one or more resource parameter values 138 may be used to determine whether a proposed "healing" resource would be adequate, e.g., to support one or more performance parameter 108 functionality levels.

It should be noted that in various implementations, for each capability 104 relative to which negotiation takes place, a healing resolution proposed through negotiation is required to be in accordance with (a) one or more performance parameters 108 applicable to that capability, and (b) one or more priorities 150 applicable to that capability. It also should be noted that negotiating among nodes 28 and/or applications 34 takes place in accordance with the predefined capability hierarchy 154, to ensure that a resolution of a capability change supports any and all capabilities 104 underlying a capability 104 for which the resolution is proposed. Thus negotiation begins with reference to the highest capability 104 for which resolution is sought and is repeated for each underlying capability. (Where a resolution is sought only at the interoperability level, there is no underlying capability to check.)

Figure 4:
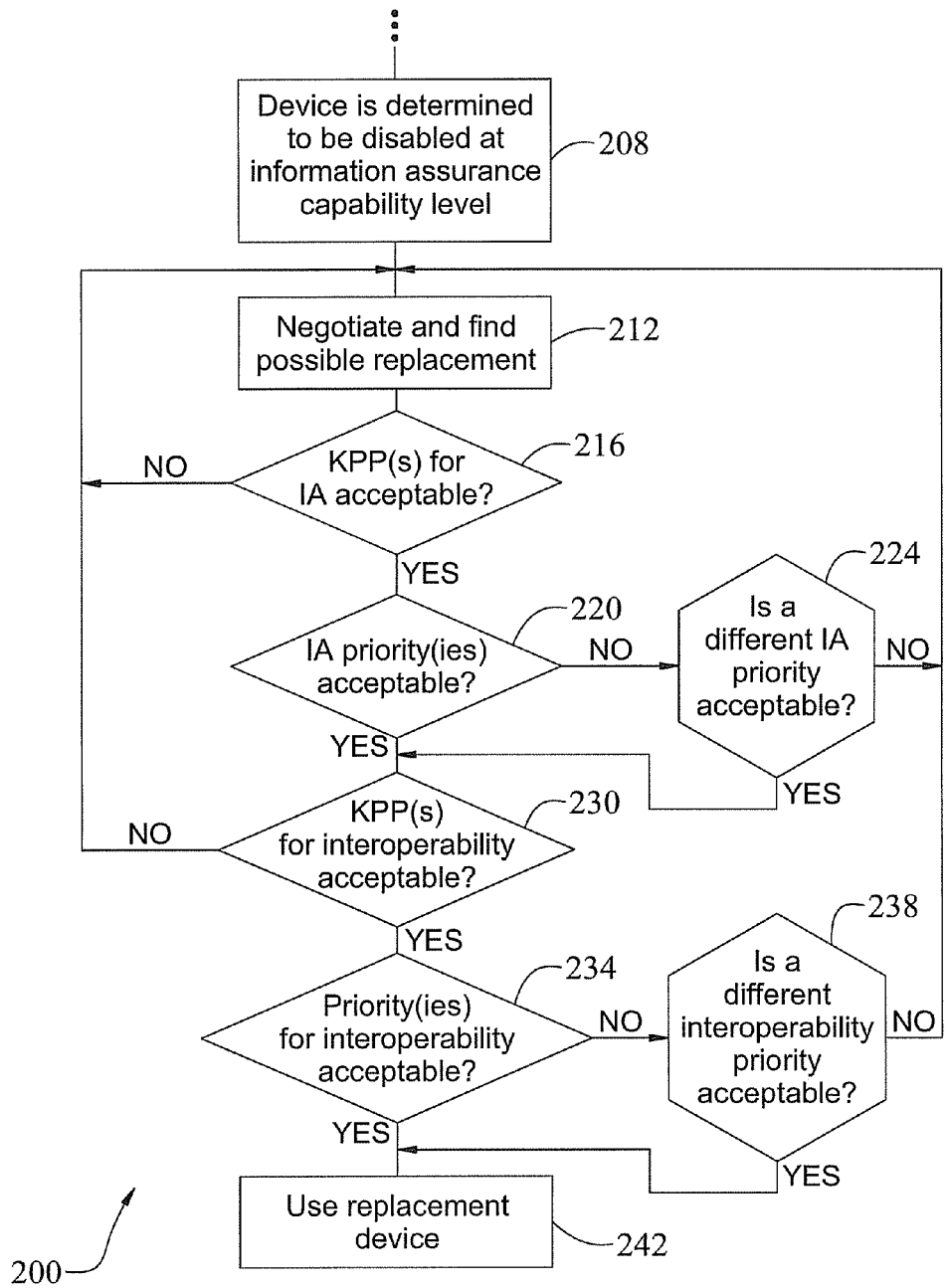
FIG. 4 is a flow diagram of a method of performing self-healing in accordance with one implementation of the present disclosure.

Consider an exemplary application, e.g., an encryption device that utilizes only two NCO capabilities, interoperability 158 and information assurance 162, and that is determined to be no longer transmitting. Self-healing may take place as described in the flow diagram generally referred to in FIG. 4 by reference number 200. It is determined in step 208, e.g., by a node 28 hosting an application 34 using the device, that the device is disabled due to a problem at the information assurance capability level. In step 212 the host node 28 negotiates with other nodes 28 at the same network level for a replacement resource (in this case, another encryption device) and locates a possible replacement device. In step 216 it is determined whether the proposed replacement device meets the disabled device KPP 108 requirements at the information assurance capability level 162. If the information assurance KPPs for the replacement device are not acceptable, then in step 212 negotiation continues until another possible replacement device is located. If in step 216 the information assurance KPPs for the replacement device are determined to be acceptable, then in step 220 information assurance priorities 150 for the replacement device are compared with those of the disabled device. If the replacement device information assurance priorities 150 are not acceptable, then in step 224 the host node 28 determines, e.g., by a request to a human commander, whether a lower priority would be acceptable or a higher priority might be assigned. If not, then negotiation may resume in step 212.

If the replacement device information assurance priorities 150 are acceptable, then any underlying capabilities (in this case, only interoperability 158) remain to be checked, to complete the determination as to whether the proposed device is acceptable. Accordingly, in step 230 it is determined whether the proposed replacement device meets the disabled device KPP 108 requirements at the interoperability capability level 158. If the interoperability KPPs for the replacement device are not acceptable, then negotiation may continue in step 212 until another possible replacement device is located.

It should be noted generally that it may be possible to propose a reduction in KPP functionality level as a possible healing solution, although such a reduction might not be acceptable depending on the particular application for which healing is sought. If in step 230 the interoperability KPPs for the replacement device are determined to be acceptable, then in step 234 interoperability priorities 150 for the replacement device are compared with those of the disabled device. If the replacement device interoperability priorities 150 are not acceptable, then in step 238 the host node 28 determines, e.g., by a request to a human commander, whether a lower priority would be acceptable or a higher priority to access the resource could be assigned. If not, then negotiation may resume in step 212. Although not shown in FIG. 4, negotiation (and possibly the application 34 needing the encryption device) may be terminated if a required probability of effectiveness is determined not to be met. If interoperability priorities 150 are acceptable, then in step 242 the replacement device may be deemed appropriate for use by the application. The replacement device is attached to the application and it is verified whether the replacement device will work as specified. Verification may be performed in the same or similar manner as the previous determination that the replaced device was disabled.

Numbers of iterations are determined by capability. Where, e.g., a resolution is sought at the communities-of-interest capability level 176, five iterations, one for each capability 104, would be performed (as indicated in the communities-of-interest row 160 of the hierarchy 154) instead of the foregoing two iterations shown in FIG. 4. Similarly, where a resolution is sought at the knowledge management capability level 172, four iterations would be performed (in the order indicated in the knowledge management row 160 of the hierarchy 154). It should be noted that in various implementations, the foregoing self-healing process can take place across network boundaries and network layers. Various procedures also are possible whereby resources may be proposed to provide self-healing. Such procedures could include, for example, a pre-designated hierarchy of acceptable ranges of solutions, a predefined "depot" for healing resources, and/or predefined sets of searches for resources to be made along various chains.

The foregoing methods and systems define a capability framework for self-healing in a network centric environment. The foregoing methods and systems can provide an ability to find lost assets and quickly reconstruct an application on the fly, using allocated and reallocated resources. Thus an application may be enabled to continue even under rapidly changing circumstances.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for performing a mission and control operation utilizing an integrated application in a network-centric environment requiring an availability of one or more predefined capabilities attributed to the integrated application, each said capability assigned one or more priorities for the integrated application, the system comprising at least one node comprising:
at least one processor configured to:
identify a change in the one or more predefined capabilities;
determine a probability of effectiveness for the integrated application; and
negotiate in the network-centric environment to resolve the change; and
the at least one processor further configured to negotiate until the integrated application is provided with one or more resources resolving the change in accordance with one or more applicable priorities of the one or more priorities and the determined probability of effectiveness;
wherein the one or more predefined capabilities are hierarchically ordered, and the at least one processor is configured to negotiate as to each of the one or more predefined capabilities in the hierarchical order; and
wherein the integrated application includes a plurality of applications, and each one of said plurality of applications is attributed with one or more of the predefined capabilities;
wherein the at least one processor is configured to negotiate to resolve the change in accordance with one or more performance parameters applicable to the integrated application.

2. The system of claim 1, wherein each of the one or more capabilities includes one or more functionality levels, and the at least one processor is configured to negotiate to resolve the change in accordance with one or more applicable functionality levels.

3. The system of claim 1, wherein the at least one processor is configured to modify one or more priorities to resolve the change.

4. The system of claim 1, wherein the one or more capabilities include at least interoperability.

5. The system of claim 1, wherein the one or more resources comprise at least one of the following: storage, processing, bandwidth and an input/output port.

6. The system of claim 1, wherein the at least one processor is configured to modify one or more functionality levels to resolve the change.

7. A system for performing a mission and control operation by means of integrated applications in a network-centric environment, the system comprising:
a plurality of nodes having a plurality of applications;
the plurality of nodes and plurality of applications being configured with reference to a framework, the framework predefining an ordered relationship hierarchy of a plurality of network capabilities providable by the plurality of applications and plurality of nodes in the network-centric environment, the ordered relationship hierarchy having interoperability as a base capability upon which all other predefined network capabilities depend;
at least one processor embedded within at least one node of the plurality of nodes configured to:
identify a change in the predefined network capabilities attributed to a given application;
determine a probability of effectiveness for the given application;
negotiate in the network-centric environment to resolve the change;
the at least one processor further configured to negotiate until the given application is provided with one or more resources resolving the change in accordance with one or more priorities and the determined probability of effectiveness of the given application;
wherein each one of said plurality of applications is attributed with one or more of the predefined network capabilities, and each of the predefined network capabilities being attributed to the one given application assigned the one or more priorities and being qualified by one or more performance parameters; and
wherein the at least one processor is configured to negotiate to resolve the change in accordance with one or more performance parameters applicable to the given application.

8. The system of claim 7, wherein each said plurality of application is attributed with one or more of the predefined capabilities, and each of the capabilities being attributed to the one given application having one or more assigned priorities.

9. The system of claim 7, wherein each of the one or more capabilities attributed to the given application includes one or more functionality levels.

10. The system of claim 7, wherein the at least one processor is configured to negotiate to resolve the change in accordance with one or more functionality levels applicable to the given application.

11. The system of claim 7, wherein the at least one processor is configured to modify one or more priorities of the given application to resolve the change.

12. The system of claim 7, wherein the at least one processor is configured to negotiate, as to each one of the one or more capabilities, in an order determined by the hierarchy.

* * * * *